US007680471B2

(12) United States Patent
Emory

(10) Patent No.: US 7,680,471 B2
(45) Date of Patent: Mar. 16, 2010

(54) SYSTEM AND METHOD FOR PROLONGING WIRELESS DATA PRODUCT'S LIFE

(75) Inventor: Tom Emory, Warminster, PA (US)

(73) Assignee: Numerex Corp., Atlanta, GA (US)

( * ) Notice: Subject to any disclaimer, the term of this patent is extended or adjusted under 35 U.S.C. 154(b) by 502 days.

(21) Appl. No.: 11/804,199

(22) Filed: May 17, 2007

(65) Prior Publication Data
US 2008/0045269 A1 Feb. 21, 2008

Related U.S. Application Data

(60) Provisional application No. 60/801,002, filed on May 17, 2006.

(51) Int. Cl.
H04B 1/38 (2006.01)
(52) U.S. Cl. .............. 455/142; 455/466; 455/550.1
(58) Field of Classification Search .......... 455/418, 455/419, 422, 426.1, 466, 550.1, 552.1, 553.1, 455/575.1, 140, 142; 375/259, 260, 261
See application file for complete search history.

(56) References Cited

U.S. PATENT DOCUMENTS

| 3,581,019 | A | 5/1971 | Ryan .......................... 179/41 |
| 3,886,515 | A | 5/1975 | Cottin et al. .................. 340/23 |
| 3,973,200 | A | 8/1976 | Akerberg ..................... 325/55 |
| 4,172,969 | A | 10/1979 | Levine et al. ............. 179/2 EC |
| 4,219,698 | A | 8/1980 | Birilli et al. .................. 179/5 P |
| 4,263,480 | A | 4/1981 | Levine ..................... 179/2 EC |
| 4,284,849 | A | 8/1981 | Anderson et al. ........... 179/5 R |
| 4,342,986 | A | 8/1982 | Buskirk et al. .............. 340/539 |
| 4,361,730 | A | 11/1982 | Barber et al. ............... 179/5 R |
| 4,371,751 | A | 2/1983 | Hilligoss, Jr. et al. ....... 179/5 R |
| 4,412,292 | A | 10/1983 | Sedam et al. |
| 4,454,027 | A | 6/1984 | Fenton ....................... 208/253 |
| 4,486,624 | A | 12/1984 | Puhl et al. ................... 179/2 EB |
| 4,492,820 | A | 1/1985 | Kennard et al. ............. 179/5 P |
| 4,644,347 | A | 2/1987 | Lucas et al. ............. 340/825.04 |
| 4,644,351 | A | 2/1987 | Zabarsky et al. ........ 340/825.44 |
| 4,646,082 | A | 2/1987 | Engel et al. ............. 340/825.54 |
| 4,677,653 | A | 6/1987 | Weiner et al. .................. 379/58 |

(Continued)

FOREIGN PATENT DOCUMENTS

EP 0 123 456 A2 10/1984

(Continued)

OTHER PUBLICATIONS

International Search Report for PCT/US 07/11864 issued Jan. 16, 2008.

(Continued)

Primary Examiner—Thanh C Le
(74) Attorney, Agent, or Firm—King & Spalding

(57) ABSTRACT

Digital upgrade system and method for translating analog commands and digital commands in wireless customer services premises equipment (CPE). The digital upgrade system receives a command from a CPE Host and translates the command from analog to digital in order to broadcast it over a wireless digital network to be received by a client. Alternatively, the digital upgrade system receives a digital command from a digital network and translates it to an analog command to be received by a functionality module of a wireless CPE Host.

20 Claims, 8 Drawing Sheets

U.S. PATENT DOCUMENTS

| | | | |
|---|---|---|---|
| 4,724,425 A | 2/1988 | Gerhart et al. | 340/539 |
| 4,734,928 A | 3/1988 | Weiner et al. | 379/59 |
| 4,750,197 A | 6/1988 | Denekamp et al. | 379/58 |
| 4,766,548 A | 8/1988 | Cedrone et al. | 364/479 |
| 4,783,747 A | 11/1988 | Komori et al. | |
| 4,791,658 A | 12/1988 | Simon et al. | 379/41 |
| 4,807,225 A | 2/1989 | Fitch | 370/71 |
| 4,814,763 A | 3/1989 | Nelson et al. | 340/825.44 |
| 4,823,123 A | 4/1989 | Siwiak | 340/825.44 |
| 4,825,193 A | 4/1989 | Siwiak et al. | 340/311.1 |
| 4,825,457 A | 4/1989 | Lebowitz | 379/40 |
| 4,833,701 A | 5/1989 | Comroe et al. | 379/60 |
| 4,837,800 A | 6/1989 | Freeburg et al. | 379/59 |
| 4,839,917 A | 6/1989 | Oliver | 379/45 |
| 4,866,445 A | 9/1989 | Valero et al. | 341/106 |
| 4,868,560 A | 9/1989 | Oliwa et al. | 340/825.44 |
| 4,868,859 A | 9/1989 | Sheffer | 379/39 |
| 4,875,038 A | 10/1989 | Siwiak et al. | 340/825.44 |
| 4,875,230 A | 10/1989 | Blair | 379/63 |
| 4,882,579 A | 11/1989 | Siwiak | 340/825.44 |
| 4,887,290 A | 12/1989 | Dop et al. | 379/33 |
| 4,887,291 A | 12/1989 | Stillwell | 379/39 |
| 4,890,315 A | 12/1989 | Bendixen et al. | 379/59 |
| 4,891,637 A | 1/1990 | Siwiak et al. | 340/825.44 |
| 4,891,638 A | 1/1990 | Davis | 340/825.44 |
| 4,901,340 A | 2/1990 | Parker et al. | 379/60 |
| 4,905,234 A | 2/1990 | Childress et al. | 370/94.1 |
| 4,914,651 A | 4/1990 | Lusignan | 370/69.1 |
| 4,928,096 A | 5/1990 | Leonardo et al. | 340/825.44 |
| 4,940,963 A | 7/1990 | Gutman et al. | 340/313 |
| 4,972,460 A | 11/1990 | Sasuta | 379/60 |
| 4,979,169 A | 12/1990 | Almond et al. | 370/99 |
| 4,993,059 A | 2/1991 | Smith et al. | 379/39 |
| 5,005,014 A | 4/1991 | Jasinski | 340/825.44 |
| 5,010,584 A | 4/1991 | Seki | 455/83 |
| 5,020,091 A | 5/1991 | Krolopp et al. | 379/58 |
| 5,020,093 A | 5/1991 | Pireh | 379/59 |
| 5,027,383 A | 6/1991 | Sheffer | 379/39 |
| 5,029,098 A | 7/1991 | Levasseur | |
| 5,031,204 A | 7/1991 | McKernan | 379/63 |
| 5,047,763 A | 9/1991 | Kuznicki et al. | 340/825.44 |
| 5,073,919 A | 12/1991 | Hagensick | 379/29 |
| 5,081,667 A | 1/1992 | Drori et al. | 379/59 |
| 5,087,919 A | 2/1992 | Odagawa et al. | 342/357 |
| 5,090,051 A | 2/1992 | Muppidi et al. | 379/61 |
| 5,117,449 A | 5/1992 | Metroka et al. | 379/58 |
| 5,121,503 A | 6/1992 | Davis | 455/12.1 |
| 5,124,697 A | 6/1992 | Moore | 340/825.44 |
| 5,131,019 A | 7/1992 | Sheffer et al. | 379/39 |
| 5,134,644 A | 7/1992 | Garton et al. | 379/39 |
| 5,142,279 A | 8/1992 | Jasinski et al. | 340/825.44 |
| 5,148,473 A | 9/1992 | Freeland et al. | 379/59 |
| 5,153,582 A | 10/1992 | Davis | 340/825.44 |
| 5,153,902 A | 10/1992 | Buhl et al. | 379/57 |
| 5,153,903 A | 10/1992 | Eastmond et al. | 379/57 |
| 5,159,625 A | 10/1992 | Zicker | 379/59 |
| 5,162,790 A | 11/1992 | Jasinski | 340/825.44 |
| 5,173,933 A | 12/1992 | Jabs et al. | 379/58 |
| 5,175,758 A | 12/1992 | Levanto et al. | 379/57 |
| 5,185,779 A | 2/1993 | Dop et al. | 379/33 |
| 5,196,842 A | 3/1993 | Gomez et al. | 340/825.44 |
| 5,206,855 A | 4/1993 | Schwendeman et al. | 370/50 |
| 5,207,784 A | 5/1993 | Schwartzendruber | |
| 5,208,756 A | 5/1993 | Song | 364/449 |
| 5,210,787 A | 5/1993 | Hayes et al. | 379/60 |
| 5,218,367 A | 6/1993 | Sheffer et al. | 342/457 |
| 5,220,599 A | 6/1993 | Sasano et al. | 379/142 |
| 5,222,123 A | 6/1993 | Brown et al. | 379/57 |
| 5,230,081 A | 7/1993 | Yamada et al. | 455/33.1 |
| 5,239,294 A | 8/1993 | Flanders et al. | 340/825.34 |
| 5,239,678 A | 8/1993 | Grube et al. | 455/34.1 |
| 5,247,567 A | 9/1993 | Hirano | 379/61 |
| 5,254,986 A | 10/1993 | DeLuca | 340/825.44 |
| 5,255,307 A | 10/1993 | Mizikovsky | 379/58 |
| 5,265,150 A | 11/1993 | Helmkamp et al. | 379/58 |
| 5,278,539 A | 1/1994 | Lauterbach et al. | 340/539 |
| 5,278,890 A | 1/1994 | Beeson, Jr. et al. | 379/57 |
| 5,305,217 A | 4/1994 | Nakamura et al. | 364/242.02 |
| 5,307,399 A | 4/1994 | Dai et al. | 379/57 |
| 5,307,509 A | 4/1994 | Michalon et al. | 455/54.1 |
| 5,335,278 A | 8/1994 | Matchett et al. | 380/23 |
| 5,341,410 A | 8/1994 | Aron et al. | 379/59 |
| 5,363,427 A | 11/1994 | Ekstrom et al. | 379/58 |
| 5,365,573 A | 11/1994 | Sakamoto et al. | 379/61 |
| 5,369,681 A | 11/1994 | Boudreau et al. | 379/87 |
| 5,371,781 A | 12/1994 | Ardon | 379/59 |
| 5,371,898 A | 12/1994 | Grube et al. | 455/33.1 |
| 5,382,970 A | 1/1995 | Kiefl | 348/1 |
| 5,386,209 A | 1/1995 | Thomas | 340/539 |
| 5,396,537 A | 3/1995 | Schwendeman | 379/57 |
| 5,396,539 A | 3/1995 | Slekys et al. | 379/59 |
| 5,398,277 A | 3/1995 | Martin, Jr. et al. | 379/39 |
| 5,404,392 A | 4/1995 | Miller et al. | 379/60 |
| 5,432,841 A | 7/1995 | Rimer | 379/59 |
| 5,450,329 A | 9/1995 | Tanner | 364/449 |
| 5,453,730 A | 9/1995 | De-Grinis et al. | |
| 5,454,027 A | 9/1995 | Kennedy et al. | 379/60 |
| 5,493,722 A | 2/1996 | Gunn et al. | 455/54.1 |
| 5,502,761 A | 3/1996 | Duncan et al. | 379/142 |
| 5,511,072 A | 4/1996 | Delprat | 370/68.1 |
| 5,511,110 A | 4/1996 | Drucker | 379/57 |
| 5,517,547 A | 5/1996 | Ladha et al. | 379/40 |
| 5,519,756 A | 5/1996 | Clift | 379/44 |
| 5,526,401 A | 6/1996 | Roach, Jr. et al. | 379/59 |
| 5,528,664 A | 6/1996 | Slekys et al. | 379/58 |
| 5,530,736 A | 6/1996 | Comer et al. | 379/58 |
| 5,533,094 A | 7/1996 | Sanmugam | 379/57 |
| 5,539,810 A | 7/1996 | Kennedy, III et al. | 379/59 |
| 5,544,223 A | 8/1996 | Robbins et al. | 379/58 |
| 5,544,225 A | 8/1996 | Kennedy, III et al. | 379/59 |
| 5,546,444 A | 8/1996 | Roach, Jr. et al. | 379/59 |
| 5,574,975 A | 11/1996 | Hill | 455/51.2 |
| 5,579,372 A | 11/1996 | Åström | 379/58 |
| 5,586,177 A | 12/1996 | Farris et al. | 379/230 |
| 5,594,740 A | 1/1997 | LaDue | 379/59 |
| 5,594,945 A | 1/1997 | Lewis et al. | 455/38.1 |
| 5,596,573 A | 1/1997 | Bertland | 370/474 |
| 5,603,091 A | 2/1997 | Linquist et al. | 455/56.1 |
| 5,610,973 A | 3/1997 | Comer | 379/59 |
| 5,619,209 A | 4/1997 | Horstein et al. | 342/352 |
| 5,625,889 A | 4/1997 | Chikkaswamy et al. | 455/67.1 |
| 5,629,975 A | 5/1997 | Tiedemann, Jr. et al. | 379/60 |
| 5,640,139 A | 6/1997 | Egeberg | 340/426 |
| 5,648,966 A | 7/1997 | Kondo et al. | 370/245 |
| 5,652,564 A | 7/1997 | Winbush | |
| 5,652,570 A | 7/1997 | Lepkofker | 340/573 |
| 5,675,371 A | 10/1997 | Barringer | 348/6 |
| 5,678,179 A | 10/1997 | Turcotte et al. | 455/331 |
| 5,680,551 A | 10/1997 | Martino, II | 395/200.15 |
| 5,684,858 A | 11/1997 | Hartmann et al. | 379/40 |
| 5,686,888 A | 11/1997 | Welles, II et al. | 340/539 |
| 5,701,302 A | 12/1997 | Geiger | 370/521 |
| 5,722,067 A | 2/1998 | Fougnies et al. | 455/406 |
| 5,742,668 A | 4/1998 | Pepe et al. | 379/58 |
| 5,742,905 A | 4/1998 | Pepe et al. | 455/461 |
| 5,745,867 A | 4/1998 | Mills | 701/207 |
| 5,748,104 A | 5/1998 | Argyroudis et al. | 340/870.11 |
| 5,751,789 A | 5/1998 | Farris et al. | 379/34 |
| 5,754,954 A | 5/1998 | Cannon et al. | 455/419 |
| 5,758,313 A | 5/1998 | Shah et al. | 701/208 |
| 5,761,621 A | 6/1998 | Sainton | 455/453 |
| 5,767,788 A | 6/1998 | Ness | 340/825.49 |
| 5,768,343 A | 6/1998 | Dame et al. | 379/33 |
| 5,777,605 A | 7/1998 | Yoshinobu et al. | 345/173 |

| Patent | Date | Inventor | Class |
|---|---|---|---|
| 5,781,612 A | 7/1998 | Choi et al. | 379/58 |
| 5,787,149 A | 7/1998 | Yousefi et al. | 379/59 |
| 5,787,357 A | 7/1998 | Salin | 455/466 |
| 5,790,631 A | 8/1998 | Minarczik et al. | 379/2 |
| 5,793,306 A | 8/1998 | Vershinin et al. | |
| 5,794,144 A | 8/1998 | Comer et al. | 455/426 |
| 5,797,097 A | 8/1998 | Roach, Jr. et al. | 455/456 |
| 5,805,997 A | 9/1998 | Farris | 455/461 |
| 5,819,184 A | 10/1998 | Cashman | 455/553 |
| 5,822,221 A | 10/1998 | Groenteman | 364/550 |
| 5,822,423 A | 10/1998 | Jehnert et al. | 379/352 |
| 5,826,195 A | 10/1998 | Westerlage et al. | 455/456 |
| 5,835,868 A | 11/1998 | McElroy et al. | |
| 5,844,808 A | 12/1998 | Konsmo et al. | |
| 5,845,203 A | 12/1998 | LaDue | 455/414 |
| 5,845,211 A | 12/1998 | Roach, Jr. | 455/456 |
| 5,862,201 A | 1/1999 | Sands | 379/226 |
| 5,862,480 A | 1/1999 | Wild et al. | 455/432 |
| 5,862,481 A | 1/1999 | Kulkarni et al. | 455/432 |
| 5,873,043 A | 2/1999 | Comer | 455/458 |
| 5,875,863 A | 3/1999 | Jarvis et al. | 180/65.4 |
| 5,878,351 A | 3/1999 | Alanara et al. | 455/466 |
| 5,884,216 A | 3/1999 | Shah et al. | 701/207 |
| 5,889,474 A | 3/1999 | LaDue | 340/825.49 |
| 5,898,917 A | 4/1999 | Batni et al. | 455/564 |
| 5,901,142 A | 5/1999 | Averbuch et al. | 370/329 |
| 5,909,651 A | 6/1999 | Chander et al. | 455/466 |
| 5,913,166 A | 6/1999 | Buttitta et al. | 455/436 |
| 5,917,449 A | 6/1999 | Sanderford et al. | 342/457 |
| 5,917,886 A | 6/1999 | Halkio | 379/37 |
| 5,918,172 A | 6/1999 | Saunders et al. | 455/404 |
| 5,920,822 A | 7/1999 | Houde et al. | 455/466 |
| 5,923,731 A | 7/1999 | McClure | |
| 5,924,026 A | 7/1999 | Krishnan | 455/414 |
| 5,933,784 A | 8/1999 | Gallagher et al. | 455/552 |
| 5,946,629 A | 8/1999 | Sawyer et al. | 455/466 |
| 5,946,630 A | 8/1999 | Willars et al. | 455/466 |
| 5,983,197 A | 11/1999 | Enta | |
| 5,999,808 A | 12/1999 | LaDue | 455/412 |
| 6,011,321 A | 1/2000 | Stancu et al. | |
| 6,012,013 A | 1/2000 | McBurney | 701/207 |
| 6,012,014 A | 1/2000 | Koyanagi et al. | 701/208 |
| 6,014,089 A | 1/2000 | Tracy et al. | 340/870.02 |
| 6,018,657 A | 1/2000 | Kennedy, III et al. | 455/426 |
| 6,021,394 A | 2/2000 | Takahashi | |
| 6,025,774 A | 2/2000 | Forbes | 340/426 |
| 6,026,345 A | 2/2000 | Shah et al. | 701/117 |
| 6,049,273 A | 4/2000 | Hess | 340/539 |
| 6,067,454 A | 5/2000 | Foti | 455/433 |
| 6,070,070 A | 5/2000 | Ladue | 455/419 |
| 6,072,862 A | 6/2000 | Srinivasan | 379/100.08 |
| 6,078,811 A | 6/2000 | Lin et al. | 455/433 |
| 6,078,820 A | 6/2000 | Wells et al. | 455/466 |
| 6,081,514 A | 6/2000 | Raith | 370/321 |
| 6,081,546 A | 6/2000 | Williamson et al. | 375/33 |
| 6,088,431 A | 7/2000 | LaDue | 379/114 |
| 6,094,578 A | 7/2000 | Purcell et al. | 455/426 |
| 6,097,951 A | 8/2000 | Ernam et al. | 455/433 |
| 6,108,537 A | 8/2000 | Comer et al. | 455/426 |
| 6,108,540 A | 8/2000 | Sonti et al. | 455/433 |
| 6,111,539 A | 8/2000 | Mannings et al. | 342/357.09 |
| 6,119,014 A | 9/2000 | Alperovich et al. | |
| 6,122,514 A | 9/2000 | Spaur et al. | 455/448 |
| 6,125,275 A | 9/2000 | Comer et al. | 455/426 |
| 6,138,034 A | 10/2000 | Willey | 455/522 |
| 6,144,722 A | 11/2000 | Anderson et al. | 379/27 |
| 6,144,859 A | 11/2000 | LaDue | 455/511 |
| 6,148,202 A | 11/2000 | Wortham | 455/434 |
| 6,150,955 A | 11/2000 | Tracy et al. | 340/870.02 |
| 6,151,507 A | 11/2000 | Laiho et al. | 455/466 |
| 6,154,648 A | 11/2000 | Comer | 455/426 |
| 6,154,658 A | 11/2000 | Caci | 455/466 |
| 6,161,020 A | 12/2000 | Kim | 455/466 |
| 6,163,701 A | 12/2000 | Saleh et al. | 455/456 |
| 6,169,895 B1 | 1/2001 | Buhrmann et al. | 455/423 |
| 6,175,732 B1 | 1/2001 | McDaniel et al. | 455/433 |
| 6,181,981 B1 | 1/2001 | Varga et al. | |
| 6,185,198 B1 | 2/2001 | LaDue | 370/329 |
| 6,195,546 B1 | 2/2001 | Leung et al. | 455/419 |
| 6,215,404 B1 | 4/2001 | Morales | 340/577 |
| 6,233,450 B1 | 5/2001 | Seppanen | 455/426 |
| 6,236,357 B1 | 5/2001 | Corwith | 342/357.08 |
| 6,249,217 B1 | 6/2001 | Forbes | 340/426 |
| 6,259,781 B1 | 7/2001 | Crouch et al. | 379/207 |
| 6,263,212 B1 | 7/2001 | Ross et al. | 455/466 |
| 6,282,496 B1 | 8/2001 | Chowdhary | 701/220 |
| 6,285,868 B1 | 9/2001 | LaDue | 455/410 |
| 6,285,953 B1 | 9/2001 | Harrison et al. | 701/213 |
| 6,292,669 B1 | 9/2001 | Meuronen et al. | 455/466 |
| 6,297,768 B1 | 10/2001 | Allen, Jr. | 342/357.1 |
| 6,298,232 B1 | 10/2001 | Marin et al. | 455/413 |
| 6,311,056 B1 | 10/2001 | Sandidge | 455/414 |
| 6,311,060 B1 | 10/2001 | Evans et al. | 455/426 |
| 6,330,452 B1 | 12/2001 | Fattouche et al. | 455/456 |
| 6,339,731 B1 | 1/2002 | Morris et al. | |
| 6,353,743 B1 | 3/2002 | Karmel | 455/456 |
| 6,353,745 B1 | 3/2002 | Wehrend et al. | 455/466 |
| 6,363,249 B1 | 3/2002 | Nordeman et al. | 455/418 |
| 6,363,254 B1 | 3/2002 | Jones et al. | 455/456 |
| 6,363,324 B1 | 3/2002 | Hildebrant | 701/213 |
| 6,366,791 B1 | 4/2002 | Lin et al. | |
| 6,369,719 B1 | 4/2002 | Tracy et al. | 340/870.02 |
| 6,370,135 B1 | 4/2002 | Gardner | 370/352 |
| 6,377,210 B1 | 4/2002 | Moore | 342/357.13 |
| 6,389,289 B1 | 5/2002 | Voce et al. | 455/456 |
| 6,393,295 B1 | 5/2002 | Butler et al. | 455/458 |
| 6,397,056 B1 | 5/2002 | Bugnon et al. | 455/411 |
| 6,405,033 B1 | 6/2002 | Kennedy, III et al. | 455/414 |
| 6,424,828 B1 | 7/2002 | Collins et al. | 455/412 |
| 6,424,841 B1 | 7/2002 | Gustafsson | 455/466 |
| 6,457,038 B1 | 9/2002 | Defosse | 709/200 |
| 6,476,763 B2 | 11/2002 | Allen, Jr. | 342/357.1 |
| 6,484,035 B2 | 11/2002 | Allen, Jr. | 455/456 |
| 6,487,602 B1 | 11/2002 | Thakker | 709/230 |
| 6,493,556 B1 | 12/2002 | Stinson | 455/445 |
| 6,493,558 B1 | 12/2002 | Bernhart et al. | 455/466 |
| 6,515,997 B1 | 2/2003 | Feltner et al. | 370/401 |
| 6,516,197 B2 | 2/2003 | Havinis et al. | |
| 6,553,336 B1 | 4/2003 | Johnson et al. | |
| 6,560,456 B1 | 5/2003 | Lohtia et al. | 455/445 |
| 6,567,501 B1 | 5/2003 | Pernu et al. | |
| 6,570,532 B2 | 5/2003 | Mise et al. | 342/357.1 |
| 6,608,553 B2 | 8/2003 | Isobe | |
| 6,618,671 B2 | 9/2003 | Dooley et al. | 701/213 |
| 6,622,016 B1 | 9/2003 | Sladek et al. | 455/414 |
| 6,625,461 B1 | 9/2003 | Bertacchi | 455/466 |
| 6,643,511 B1 | 11/2003 | Rune et al. | |
| 6,665,532 B1 | 12/2003 | Boland et al. | |
| 6,683,881 B1 | 1/2004 | Mijares et al. | |
| 6,710,738 B2 | 3/2004 | Allen, Jr. | 342/357.1 |
| 6,714,793 B1 | 3/2004 | Carey et al. | 455/466 |
| 6,718,177 B1 | 4/2004 | Comer et al. | 455/458 |
| 6,718,237 B1 | 4/2004 | Murray et al. | 701/24 |
| 6,738,647 B1 | 5/2004 | Link, II | 455/564 |
| 6,741,853 B1 | 5/2004 | Jiang et al. | 455/418 |
| 6,741,863 B1 | 5/2004 | Chiang et al. | |
| 6,745,041 B2 | 6/2004 | Allison et al. | 455/466 |
| 6,760,580 B2 | 7/2004 | Robinson et al. | 455/412.2 |
| 6,771,949 B1 | 8/2004 | Corliss | 455/413 |
| 6,782,276 B1 | 8/2004 | Lam et al. | 455/560 |
| 6,826,397 B1 | 11/2004 | Vasa | |
| 6,856,808 B1 | 2/2005 | Comer et al. | 455/466 |
| 6,861,947 B2 | 3/2005 | Albert | |
| 6,865,191 B1 | 3/2005 | Bengtsson et al. | 370/475 |
| 6,882,843 B1 | 4/2005 | Comer | 455/445 |
| 6,959,192 B1 | 10/2005 | Cannon et al. | |

| | | | |
|---|---|---|---|
| 6,980,887 B2 | 12/2005 | Varga et al. | |
| 6,982,656 B1 | 1/2006 | Coppinger et al. | |
| 7,005,997 B1 | 2/2006 | Wiewiura | |
| 7,010,306 B1 | 3/2006 | Tanibayashi et al. | |
| 2001/0003093 A1 | 6/2001 | Lundin | 455/456 |
| 2001/0031013 A1* | 10/2001 | Stetzler et al. | 375/259 |
| 2001/0042121 A1 | 11/2001 | Defosse et al. | 709/224 |
| 2001/0047244 A1 | 11/2001 | Harrison et al. | 701/213 |
| 2001/0047410 A1 | 11/2001 | Defosse | 709/224 |
| 2001/0054083 A1 | 12/2001 | Defosse | 709/217 |
| 2002/0016829 A1 | 2/2002 | Defosse | 709/217 |
| 2002/0086636 A1 | 7/2002 | Tracy et al. | 455/3.01 |
| 2002/0110230 A1 | 8/2002 | Leuca et al. | 379/201.01 |
| 2002/0120728 A1 | 8/2002 | Braatz et al. | |
| 2002/0142759 A1 | 10/2002 | Newell et al. | |
| 2002/0155844 A1 | 10/2002 | Rankin et al. | 455/456 |
| 2002/0160771 A1 | 10/2002 | Massie et al. | 455/426 |
| 2002/0164988 A1 | 11/2002 | Vishwanathan et al. | 455/445 |
| 2002/0194387 A1 | 12/2002 | Defosse | 709/251 |
| 2002/0196924 A1 | 12/2002 | Dahari | 379/220.01 |
| 2003/0003930 A1 | 1/2003 | Allison et al. | 455/466 |
| 2003/0009313 A1 | 1/2003 | May et al. | 702/188 |
| 2003/0021273 A1 | 1/2003 | Fouquet et al. | 370/392 |
| 2003/0022656 A1 | 1/2003 | Hinnant, Jr. et al. | 455/410 |
| 2003/0054830 A1 | 3/2003 | Williams et al. | 455/456 |
| 2003/0097474 A1 | 5/2003 | Defosse et al. | 709/246 |
| 2003/0101257 A1 | 5/2003 | Godwin | 709/223 |
| 2003/0101262 A1 | 5/2003 | Godwin | 709/224 |
| 2003/0119489 A1 | 6/2003 | Mohammed | |
| 2003/0119498 A1 | 6/2003 | Haas et al. | 455/426 |
| 2003/0129969 A1 | 7/2003 | Rucinski | 455/412 |
| 2003/0141990 A1 | 7/2003 | Coon | |
| 2003/0158650 A1 | 8/2003 | Abe et al. | |
| 2003/0182053 A1 | 9/2003 | Swope et al. | |
| 2003/0204391 A1 | 10/2003 | May et al. | 704/8 |
| 2004/0029598 A1 | 2/2004 | Guggisberg | 455/466 |
| 2004/0110493 A1 | 6/2004 | Alvarez et al. | 455/414.1 |
| 2004/0142707 A1 | 7/2004 | Midkiff et al. | 455/466 |
| 2004/0180678 A1 | 9/2004 | Smith et al. | 455/466 |
| 2004/0203640 A1 | 10/2004 | Molander et al. | 455/414.1 |
| 2005/0037784 A1 | 2/2005 | Cleary | 455/466 |
| 2005/0083967 A1* | 4/2005 | Yu | 370/465 |
| 2005/0102074 A1 | 5/2005 | Kolls | |
| 2005/0197106 A1 | 9/2005 | Bristow et al. | |

FOREIGN PATENT DOCUMENTS

| | | |
|---|---|---|
| EP | 0 123 562 B1 | 7/1990 |
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |
| WO | WO 94/05095 A1 | 3/1994 |
| WO | WO 95/24791 A1 | 9/1995 |
| WO | WO 95/25407 A1 | 9/1995 |
| WO | WO 95/26088 A1 | 9/1995 |
| WO | WO 96/03007 A1 | 2/1996 |
| WO | WO 96/10895 A1 | 4/1996 |
| WO | WO 96/37079 A1 | 11/1996 |
| WO | WO 96/38989 A1 | 12/1996 |
| WO | WO 97/36435 A1 | 10/1997 |
| WO | WO 97/38540 A1 | 10/1997 |
| WO | WO 97/45991 A2 | 12/1997 |
| WO | WO 98/06227 A2 | 2/1998 |
| WO | WO 98/19438 A1 | 5/1998 |
| WO | WO 98/19447 A1 | 5/1998 |
| WO | WO 98/27780 A2 | 6/1998 |
| WO | WO 99/26428 A1 | 5/1999 |
| WO | WO 99/60769 A1 | 11/1999 |
| WO | WO 00/03532 A2 | 1/2000 |
| WO | WO 00/17021 A1 | 3/2000 |
| WO | WO 00/28347 A1 | 5/2000 |
| WO | WO 00/36812 A1 | 6/2000 |
| WO | WO 01/63825 A2 | 8/2001 |
| WO | WO 01/63960 A1 | 8/2001 |
| WO | WO 01/72068 A1 | 9/2001 |
| WO | WO 01/80583 A2 | 10/2001 |
| WO | WO 02/35866 A2 | 5/2002 |
| WO | WO 03/019925 A2 | 3/2003 |
| WO | WO 2005/074430 A2 | 8/2005 |
| WO | WO 2006/014419 A1 | 2/2006 |

OTHER PUBLICATIONS

EIA/TIA IS-54-B Standard; p. 115 and pp. 215-222.

European Telecommunication Standards Institute; *European Digital Cellular Telecommunications System (Phase 2): Technical Realization of the Short Message Service (SMS) Point to Point (PP) (GSM 03.40)*; European Telecommunication Standard; Oct. 1993; Draft pr ETS 300 536; pp. 1-103.

European Telecommunication Standards Institute; *European Digital Cellular Telecommunications System (Phase 2); Technical Realization of Short Message Service Call Broadcast (SMSCB) (GSM 03.41)*; European Telecommunication Standard; Oct. 1993; Draft pr ETS 300 537; pp. 1-24.

Lee, William C. Y.; *Mobile Cellular Telecommunications Systems*; ISBN 0-07-037030-3; 1989; pp. 74-80.

Mouly et al.; *The GSM System for Mobile Communications*; ISBN: 2-9507190-0-7; © 1992; pp. 56-59.

* cited by examiner

US 7,680,471 B2

SYSTEM AND METHOD FOR PROLONGING WIRELESS DATA PRODUCT'S LIFE

PRIORITY APPLICATION

The present invention claims priority to U.S. Provisional Patent Application No. 60/801,002, filed on May 17, 2006, which is hereby incorporated herein by reference.

FIELD OF THE INVENTION

The present invention relates generally to a system and method for prolonging the useful life of wireless data products during periods of transition from one form of wireless transfer technology to a different wireless transfer technology. More particularly described, the present invention comprises a software or hardware upgrade that allows a wireless data product affected by a transition from analog wireless transport technology to upgrade to digital wireless transport technology.

BACKGROUND OF THE INVENTION

Customer Premises Equipment (CPE) product implementations for current wireless data systems typically utilize an integrated assemblage of components that function cohesively, from the customer's perspective, as a single entity. Such multi-component products are typically housed within a single enclosure and deployed as a single product. All components are mutually interdependent upon each other and upon the underlying wireless data transport service technology that conveys the data transmitted and received between the CPE product and centralized host computer servers of the service. Thus, when a fundamental technical change occurs in one of the elements comprising such a product, or in the underlying wireless data transport service, the entire CPE product often becomes worthless until it can be completely redesigned. The costs of a rapid product redesign and service disruption while waiting for deployment of newly developed versions of the product would be excessive and prohibitive. Accordingly, there presently exists a need in the art for a software or hardware transition technology that can be interfaced with legacy CPE wireless data equipment in order to upgrade the equipment to allow it to interface with new wireless data transport technologies.

SUMMARY OF THE INVENTION

The digital upgrade system prolongs the life of CPE wireless data products when presented with fundamental technical changes to the product's operating environment that would otherwise render the product inoperable or having limited utility. By way of a representative example, the subject technology will allow wireless data products, such as the "1650" wireless device, marketed by or on behalf of Numerex Corp., to be upgraded to handle digital cellular telephone services, such as the digital Short Message Service (SMS).

The digital upgrade system mitigates both costs and disruption by permitting the upgraded products to remain in service by substituting a software interface between legacy components and a component capable of meeting the new technical requirement. For example, this upgrade approach would allow the product to remain in service during the development period of new versions of the product. In other words, the component that has become obsolete would be removed and a new software or hardware interface translation component would be substituted for the obsolete component, thus permitting the product as a whole to function in compliance with new technical requirements.

DETAIL DESCRIPTION OF THE EXEMPLARY EMBODIMENTS

Figure 1:
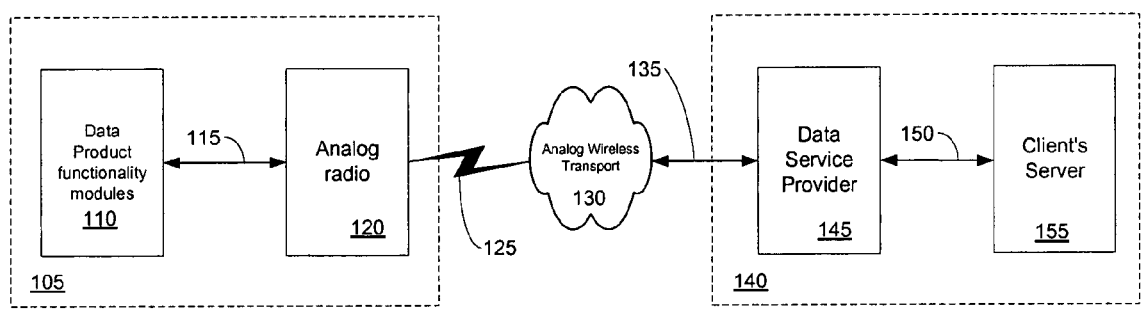
FIG. 1 is a block diagram illustrating an operating environment for a conventional wireless data product deployed on a customer's premises.

Referring now to the drawings in which like reference numerals represent like elements as noted in the several figures. FIG. 1 illustrates a CPE Host 105 utilizing a conventional analog radio transmitter 120 receiving data from a data service provider 145 through a client server 150. In this configuration, the CPE Host 105 is located remote from the client 140, although the CPE Host 105 could also be local to the client 140. As illustrated, the data product functionality module 110 (i.e., signal processing function) of the CPE Host 105 corresponds with the analog radio 120 to transmit information over the network control channel wireless transport 130 through a network link 125. The functionality module 110 comprises the logic that enables the particular application to utilize wireless data. For example, the functionality module 110 may enable a security alarm function, a vehicle location service, or an equipment operation monitor, among other functions. It should also be understood that the functionality module 110 may incorporate external interfaces that are not shown in the exemplary embodiments contained herein. Such interfaces may include, but are not limited to, door or window sensors, GPS locations, and speed sensors. In any of these cases, it is the logic program within the functionality module 110 that customizes the product application with the other parts of the wireless CPE Host 105.

When the wireless transport 130 receives data from the CPE Host 105, it transports the data to the data service provider 145 through communication link 135. Once receiving the data, the data service provider 145 can communicate with the client server 155 through a communication link 150. Thus, according to FIG. 1, the CPE Host 105 and client 140 are both in an environment where wireless data transport occurs over an analog network. Accordingly, if the client 140 and the control channel wireless data transport 130 are upgraded to digital communication protocol, such as Cellemetry® SMS, the analog radio 120 and the data product functionality module 110 of the CPE Host 105 would no longer be able to communicate with the rest of the network (e.g., the digital wireless data transport). Hence, in this conventional network, the entire CPE Host 105 would need to be upgraded if the wireless network 130 and client 140 were upgraded.

Figure 2A:
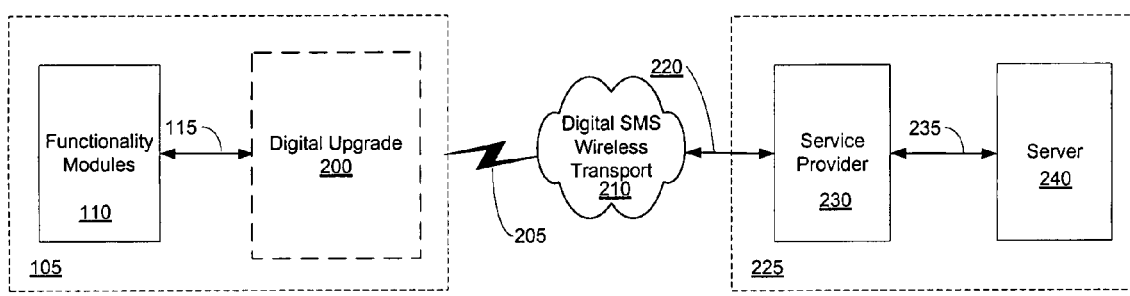
FIGS. 2A, 2B, and 2C are block diagrams illustrating an exemplary operating environment for a digital upgrade system.

FIG. 2A illustrates an operating environment for a digital upgrade system 200, according to an exemplary embodiment. If, for example, a digital SMS wireless data transport 210 replaces the conventional analog transport 130 (as depicted in FIG. 1), the digital upgrade system 200 can be utilized at the CPE Host 105 to continue to operate with the functionality module 110 over communication link 115. When the digital upgrade system 200 is installed in the CPE Host 105, as illustrated in FIG. 2A, the functionality module 110 can then communicate with the client 225 over the digital wireless data transport 210 as it had done previously with the analog radio transceiver 120 and analog network 130 (as depicted in FIG. 1). The service provider 230 can communicate with server 240 over communication link 235. The host computer server 240 of the client 225 may comprise a data service provider 230 and a client server 240. The client 225 would typically be the provider of the application to the end customers utilizing the wireless data customer premise product. Communication link 235 represents the link between the data service provider 230 and the client server 240. Typically communication link 235 would be a communication circuit such as a modem, private line, telephony network, or the Internet.

Figure 2B:
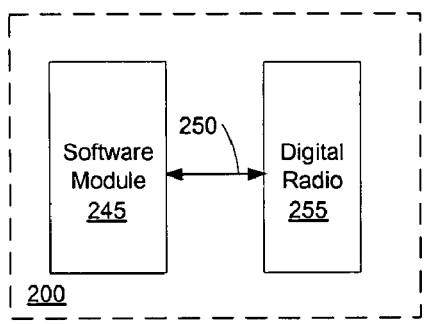
Figure 2C:
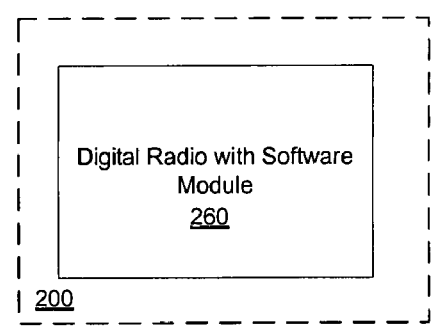

To accomplish the digital upgrade capabilities, the digital upgrade system 200 can comprise a software module 245 and digital radio module 255, as illustrated in FIG. 2B. Alternatively, the digital upgrade system 200 can comprise a joint digital radio and software module 260, as illustrated in FIG. 2C. The software module 245 is capable of translating commands or messages between a legacy CPE Host 105 and the digital radio module 255. The digital radio module 255, in turn, can communicate with a digital radio network, such as an SMS network. According to an exemplary embodiment, the software module 245 and digital radio module 255 (or combined software module and digital radio 260) have linear dimensions and a configuration similar to that of the analog radio transmitter 120 that it is replacing. That is, according to an exemplary embodiment, the digital upgrade system 200 fits within the pre-existing form factor of the analog wireless data device that it is designed to replace.

Figure 3:
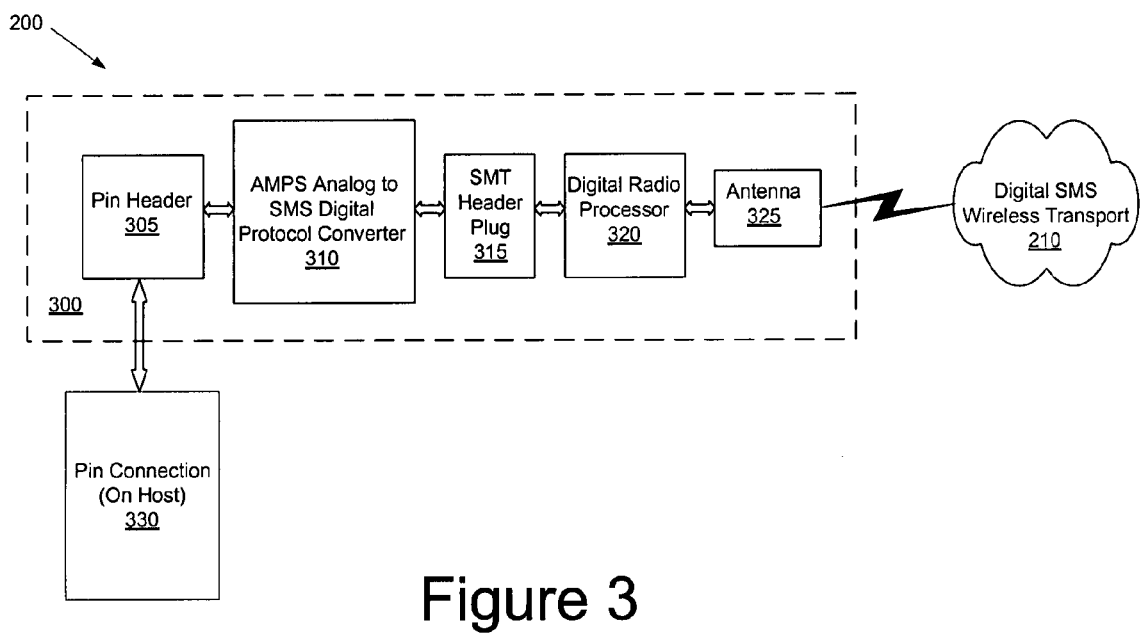
FIG. 3 is a block diagram illustrating an exemplary embodiment of a digital upgrade system.

As illustrated in FIG. 3, the digital upgrade system 200 can be integrated upon a new circuit board 300 that has the same factory pins for the host as the original analog radio transceiver 120 (as illustrated in FIG. 1). Specifically, in this exemplary embodiment of the digital upgrade system 200, a pin connection on host 330 connects with a pin 305 of the new circuit board 300. Interface requirements and interaction protocol of the new digital radio will be profoundly different from those of the analog radio transceiver. Therefore, the purpose of the software module is to translate the protocol from that utilized by the previous analog module to that required by the new digital radio. The software translation permits the data protocol products functionality module to continue using the original protocol originally utilized by the previous analog radio. The purpose of the interconnecting wiring, which is physically part of the circuit 300, is to translate the physical wiring from that utilized by the previous analog module to that required by the new digital radio. Therefore, as illustrated, the pin header 305 fits precisely within the original pin connection 330 on the CPE Host 105 host. Despite fitting perfectly with the old analog pin connection 330, the pin header 305 connects to a new digital protocol converter 310. One exemplary embodiment is represented by an AMPS analog to SMS digital converter.

The digital protocol converter 310, in general, translates the analog signals that are expected by the CPE Host 105 to digital signals that can be communicated across the new digital network 210 (as illustrated in FIG. 2). The digital protocol converter 310 then connects with a SNT header plug 315, which connects to a digital radio chip 320 and ultimately to an antenna 325. The antenna 325 is a digital antenna that can send and receive digital data through the digital SMS wireless data transport 210 (as illustrated in FIG. 2), thus allowing the CPE Host 105 and functionality module 110 to communicate with the new digital components 210, 230, 240, as illustrated in FIG. 2. Because the pin connection host 330 is not changed to connect to the pin header 305, the original design of the functionality module 110 of the customer services equipment is not altered, but is preserved. For this representative update task, the only piece that is required to be removed from the CPE Host 105 is the analog radio transceiver 120, which is replaced by the digital upgrade system 200.

Figure 4:
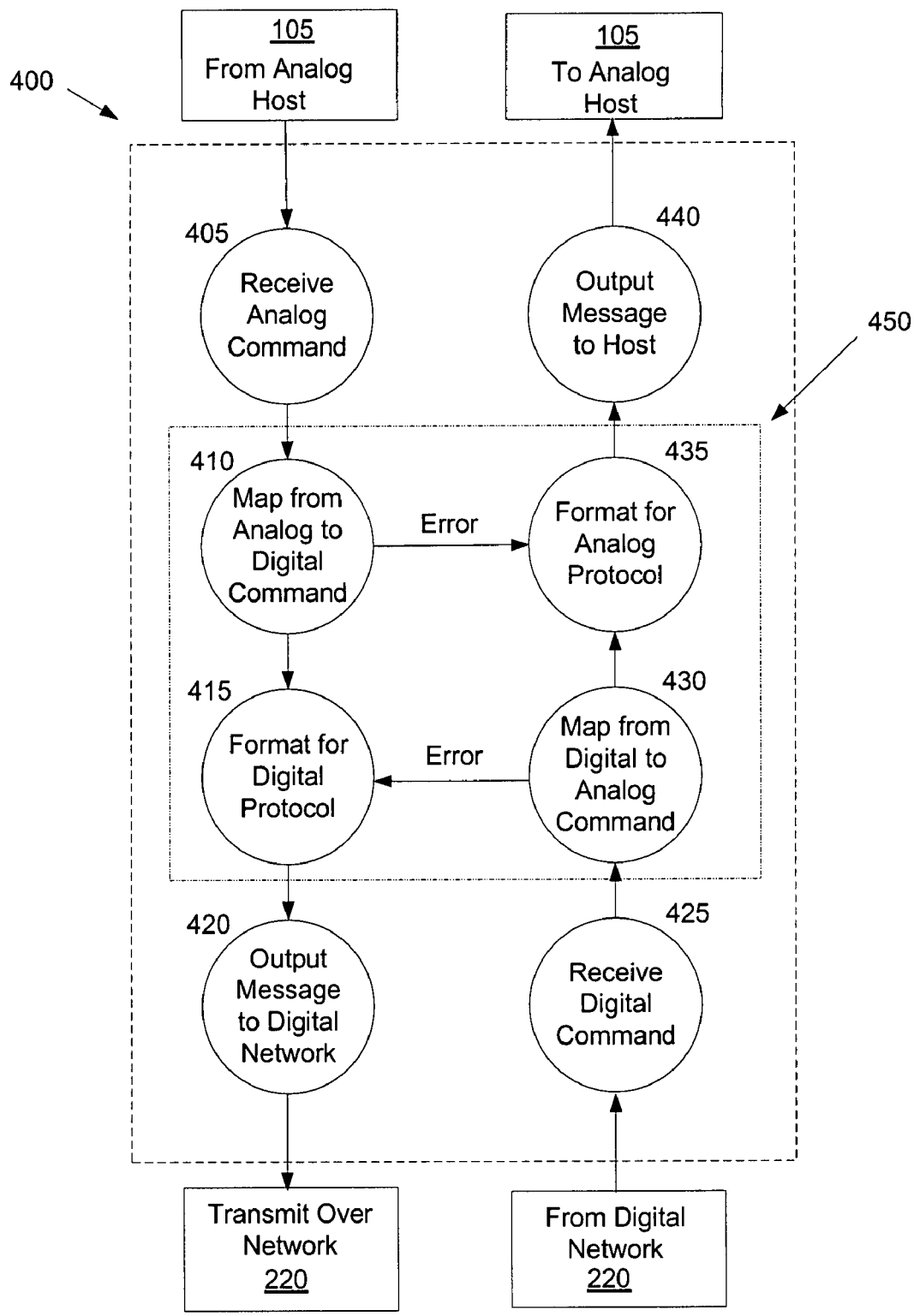
FIG. 4 is a logic flow diagram illustrating an exemplary method for implementing a digital upgrade system.

Now turning to FIG. 4, an exemplary method for converting a signal from AMPS analog to SMS digital service is illustrated. It is noted that this is one of many embodiments of utilizing the digital upgrade system 200. It is envisioned that the digital upgrade system 200 can perform any analog to digital wireless protocol conversion, as required by the specific implementation.

The digital upgrade system 200 sits between an analog host and the digital network antenna. Besides the mechanical inter-connects required, the functionality of analog and digital network protocols is uniquely different. For example, the older AMPS 1650 product, marketed by Numerex Corp., uses a proprietary protocol which is embedded within firmware. This protocol is based on the older technique of using the forward and back call set-up channels for small burst telemetry payloads, independent of the normal cellular traffic. As such, issues such as switch information (SIDs etc.), timing, and data payload (only 32 bits) are essential to the proper operation of the data transport mechanism.

Thus, the digital upgrade system 200 comprises a "protocol translator" to translate analog to digital commands and vice versa. In alternative exemplary embodiments, this protocol translator is implemented using: (1) a separate microprocessor and program; or (2) application software embedded in the radio itself, such as Open AT. Open AT is a concept which allows unused MIPS and Flash in a radio to be used for user programs (such as the converter routines).

In the exemplary embodiment illustrated in FIG. 4, the converter of the digital upgrade system 200 translates a command/message (i.e., signal) that is expected by the functionality module 110 of the customer services premise device 105 (as illustrated in FIG. 2A). Accordingly, at step 425, a digital command is received from the digital network 220. At step 430, the digital signal is mapped to an analog signal. In an exemplary embodiment, an SMS digital signal is mapped to an AMPS message by translating the protocol for the expected recipient of the message. This is done by using a mapping feature of each network so that the digital upgrade system 200 responds appropriately upon a poll from the digital network or the CPE Host 105.

Table 1 below illustrates an exemplary interrelation mapping table that can be used to translate commands that are received by the digital upgrade system 200 from a digital network.

TABLE 1

| Command | Name | Process Description |
|---|---|---|
| A | Initialize Mode | Resets the microprocessor (PIC) and clears all variables. NO RESPONSE |
| B | Polling Query | PIC responds with data, if there is any. Requests for information are sent to the PIC and responses are |

TABLE 1-continued

| Command | Name | Process Description |
|---|---|---|
| | | returned on the polling query. RESPOND AS REQUIRED |
| C | Set Default Id | Sets the default MIN within the PIC upon exit from the initialization. NO RESPONSE |
| D | Software Version Query | Request PIC Software Version ID RESPOND AS REQUIRED |
| E | Send Data | Request PIC to Send Message via Radio. RESPOND AS REQUIRED |
| F | Reset Radio | PIC to Send Reset to Digital Radio NO RESPONSE |
| G | Store Polling/ Trigger Msg Mask | PIC to store the message in a message mask NO RESPONSE |
| H | Read Message Mask | Request from PIC the mask at a location RESPOND AS REQUIRED |
| I | Clear All Message Masks | PIC clears all masks NO RESPONSE |
| J | Enable/Disable Message Masking | PIC enables message masks NO RESPONSE |
| K | Enable/Disable Message Passing | PIC enables message passing NO RESPONSE |
| L | Service Status Query | Request PIC to return status of cellular service RESPOND AS REQUIRED |

Upon receiving the command, the response is determined based on the corresponding digital command that is required by the specific implementation of the digital network. For example, if an analog command B is received, which represents a polling query, the digital upgrade system 200 will respond if it contains responsive data, or otherwise will translate the query to be transmitted to the network.

As illustrated in Table 1, a message or command intended for a wireless data device may be determined by utilizing a mobile identification number (MIN) and, in certain instances, message masks. Accordingly, according to one exemplary embodiment, the digital upgrade system 200 (or the digital radio transceiver) may utilize a MIN and mask to determine the commands broadcast over a network intended for the wireless data device. Processes for determining commands sent over a digital network by using a MIN and mask are more fully described in U.S. Pat. Nos. 5,794,144; 5,873,043; 6,311,056; and 6,738,647, which are hereby incorporated herein by reference.

Similar to Table 1, Table 2 below illustrates an exemplary translation table that can be used to translate commands received from a CPE Host to be transmitted to the digital upgrade system 200.

TABLE 2

| Command | Name | Process Description |
|---|---|---|
| A | Software Version Response | PIC responds with software version. Requires a "Polling Query" to respond |
| B | Send Data Response | This command response is returned upon the receipt of a HOST command "Send Data". The received data is packaged and sent to the Digital Radio, such as the module 255 (or 260). Requires a "Polling Query" to respond |
| C | Power On Message | Unsolicited response message on startup. PIC must startup and pass internal diagnostics (if any). Digital Radio must send initialization messages to PIC showing startup. Then PIC sends AT command to Digital Radio to ensure it is operational. PIC sends responses to HOST on power-up. NOTE: This message does NOT require a "Polling Query" |
| D | Read Message Response | PIC responds with message mask Requires a "Polling Query" to respond |
| E | Service Status Response | PIC Responds with appropriate network Requires a "Polling Query" to respond |
| F | Service Unavailable | This command response is returned upon the receipt of a HOST command "Service Status Query", the Digital Radio changes from operational to not available, failed, or service is not available. Uses MP flag Requires a "Polling Query" to respond |
| G | Service Available/ Service Status | This command response is returned upon the receipt of a HOST command "Service Status Query", the Digital Radio changes from not available to fully operational and communicating. Uses MP flag Requires a "Polling Query" to respond |
| H | Received Polling/ Trigger Msg | This command response is returned upon the receipt of a HOST command "Polling Query" and one of the masks was marked as matching. A matching mask occurs when default MIN or one of the MINs are matched from an incoming call. If multiple masks matched, then multiple messages are returned to the Host. Requires a "Polling Query" to respond |

Once the commands are mapped from analog to digital at step 410, or from digital to analog at step 430, the new command that is to be transmitted is formatted for the digital protocol at step 415 or the analog protocol at 435 and then delivered to the proper recipient (i.e., CEP host or digital network). For example, for a digital command that is to be output to a CPE Host 105, the digital command is mapped to a digital command at step 430, formatted properly at step 435, and then output to the CPE Host 105 at step 440 for use by the CPE Host's functionality module 110 (not illustrated in FIG. 4). Similarly, working in the opposite direction, if the analog CPE Host 105 transmits a message that is intended to be broadcast over the digital network, the digital upgrade system 200 will receive the analog command from the host at step 405. In turn, the digital upgrade system 200 can map the analog command to a digital command at step 420—according to the interrelation table programmed for that specific CPE Host functionality module 110. At step 415, the digital upgrade system 200 formats the message so that it can be properly sent over the digital network at step 420.

In the case of a command entering or leaving the digital upgrade system 200, errors may occur. If an error occurs when the digital command is being mapped to an analog command, the error is immediately reported back to the digital network at step 415. That is, an error message is formatted for digital delivery and then transmitted back to the client over the digital network as step 420. Likewise, if an analog command cannot be successfully mapped to a digital command at step 410, an error message is generated and formatted for analog protocol at step 435 and then transmitted to the CPE Host 105 at step 440.

Figure 5:
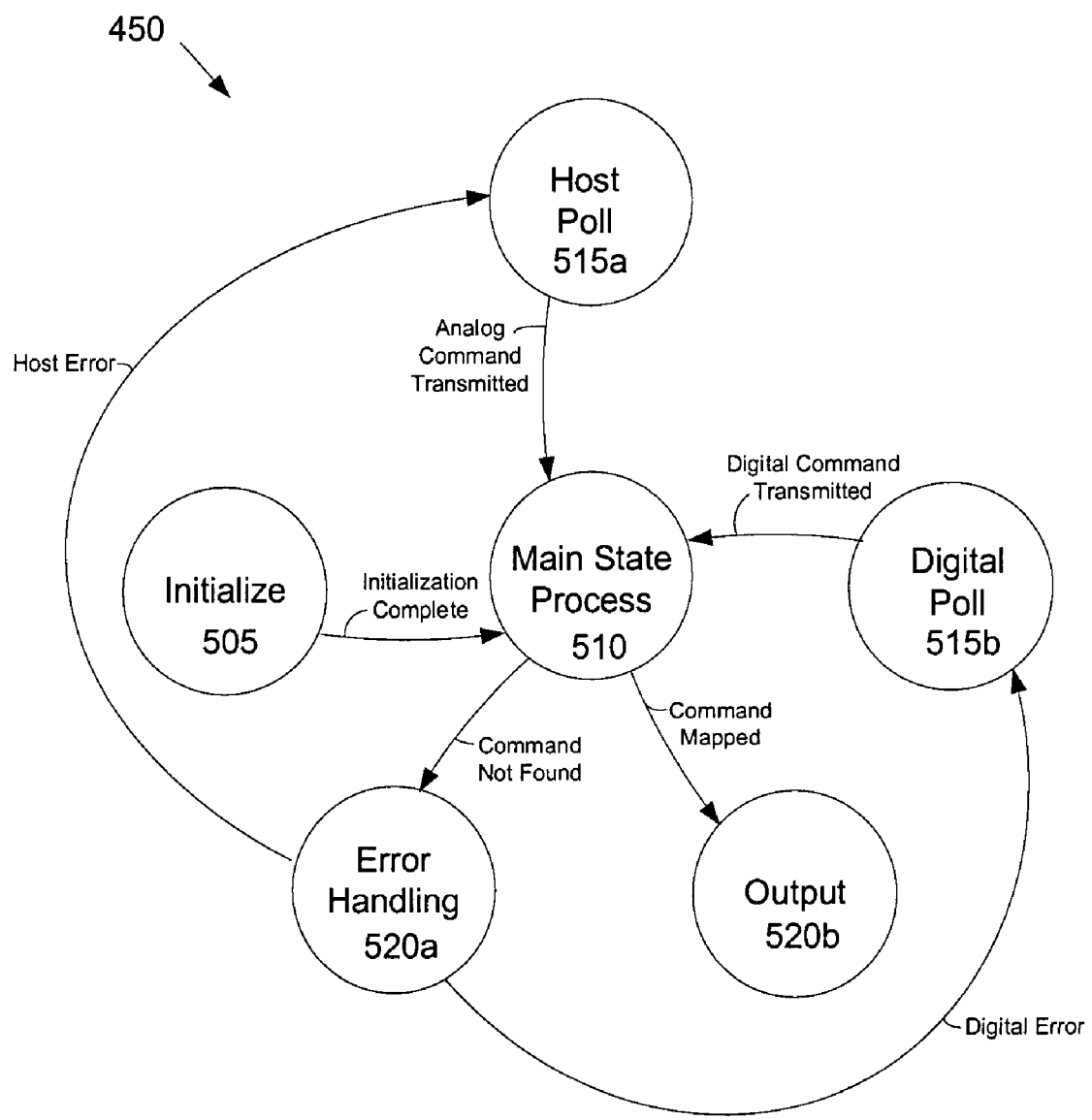
FIG. 5 is a state diagram illustrating an exemplary method for implementing a digital upgrade system.

FIG. 5 illustrates a state machine for implementing the digital upgrade system 200, according to one exemplary embodiment. As illustrated at state 505, a main state process is initialized to begin the translation process. This state is temporary and occurs only once. It initializes software components, variables, restores stored information, and ensures the health of the digital upgrade system.

Once initialization is complete, the digital upgrade system 200 enters a main state process at state 510 awaits a CPE Host 105 or digital command poll (i.e., an indication that a command is awaiting to be forwarded). The main state process comprises the interrelation table that maps the analog commands to the respective digital commands. If the CPE Host 105 polls the main state process, then state 515*a* is entered, which signifies that an analog command has been transmitted to the main state process. This state is completed when a complete message has arrived from the CPE Host 105.

After receiving the poll, the digital upgrade system 200 translates the analog command that has been transmitted and determines whether a corresponding digital command exists for the analog command. If a corresponding digital command does not exist, or a hardware or software failure occurs, the digital upgrade system 200 enters an error handling state at state 520*a* and sends an error back to the CPE Host 105 to let the host know that an error has been encountered and that it needs to re-send the command or try a different command. In this state, if the information can be obtained locally (data contained within the PIC MiniPlug 315, as illustrated in FIG. 3), then a response message is built and placed within the transmit buffer to the CPE Host 105. However, if the information must be obtained from a host such as a digital radio, then the request message is queued to the CPE Host 105 in state 520*b*. This state will then prompt a transmission to be sent on the digital network to retrieve response for the query message sent from the CPE Host 105.

Similarly at state 515*b*, a digital network may poll the main state process by transmitting a digital command to the CPE Host 105, which is first translated by the digital upgrade system 200. As with the analog command, the digital upgrade system 200 attempts to map the digital command to a corresponding analog command. If the mapping state is successful, then the command will be processed and output at state 520*b*. However, if the digital command cannot be translated to an analog command, then the error handling unit 520*a* will send a digital error message back to the digital poll at state 515*b*.

Figure 6A:
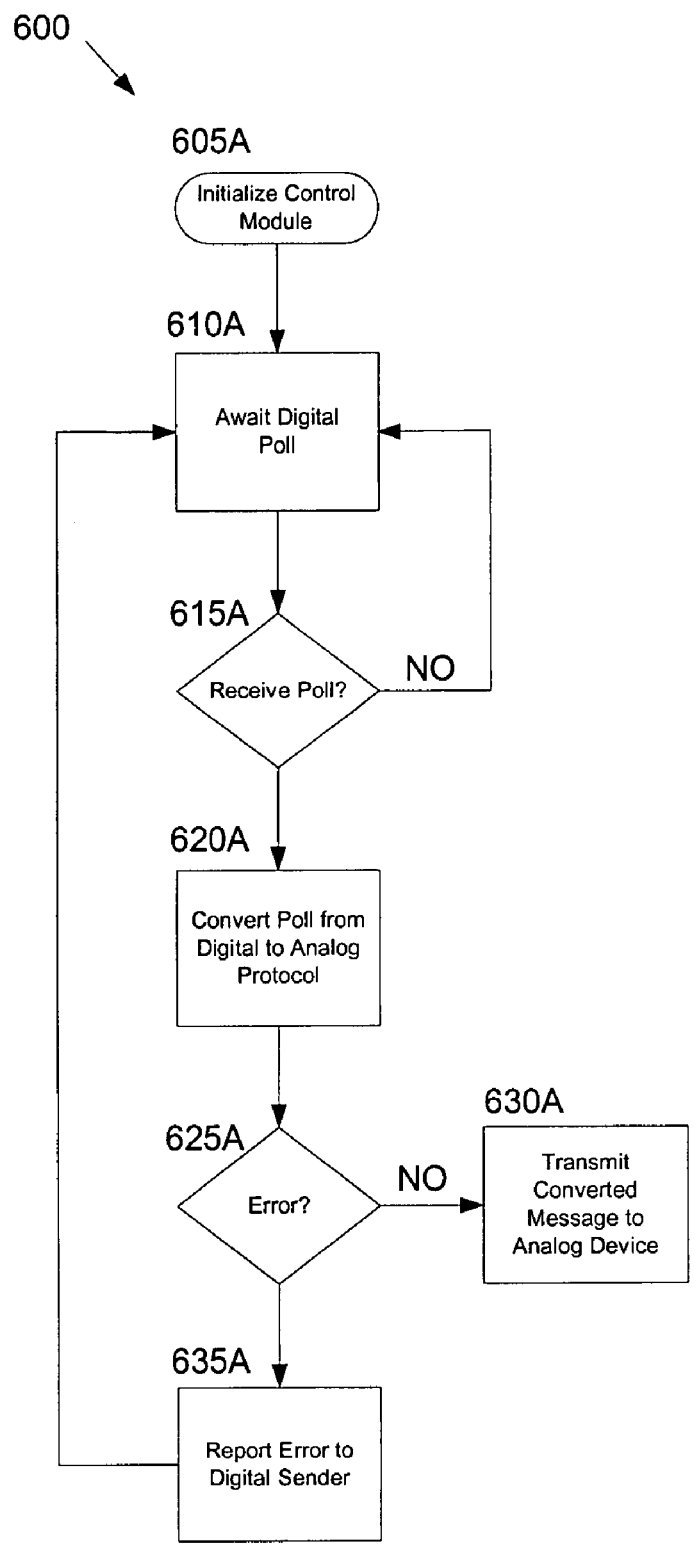
FIG. 6A and 6B are logical flow diagrams illustrating exemplary methods for implementing a digital upgrade system.
Figure 6B:
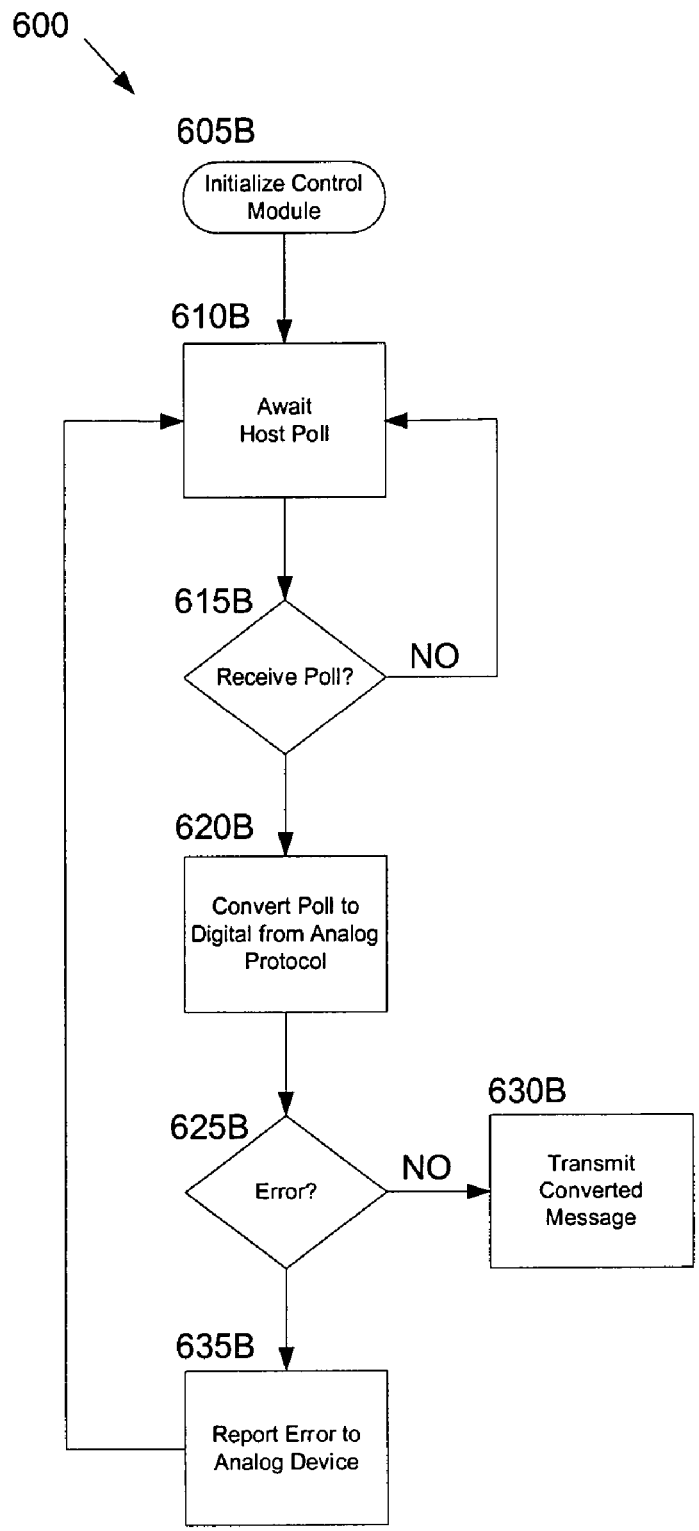

FIGS. 6*a* illustrates a method for translating digital commands to analog commands; FIG. 6*b* illustrates a method for translating analog commands to digital commands, according to exemplary embodiments. As illustrated in FIG. 6*a*, a control module (i.e., software module 245) for translating received commands/messages is initialized at FIG. 605*a*. At step 610*a*, the digital upgrade system 200 awaits a digital poll. When the poll for a command is received at step 615*a*, the command is translated from the received digital command to a corresponding analog commands at 620*a*. If there is an error in conversion at 625*a*, then a message is sent back to the digital sender (e.g., client) at step 635*a*. If an error occurs, the control module then returns to await digital a poll state at step 610*a*. If an error is not detected during translation of the digital command at step 625*a*, then the message is translated to the analog command. The converted message is then transmitted to the CPE analog wireless data device (i.e., CPE Host 105) at step 630*a* for further processing by its functionality module 110.

In FIG. 6*b*, the control module awaits a host poll at step 610*b*. If a poll is received at 615*b*, then the command is attempted to be translated to a digital command at step 620*b*. As with the digital conversion, if an error is detected in converting the analog command at step 625*b*, the error is reported to the analog wireless data device at step 635*b*. Otherwise, if there is no error, then the converted message is transmitted to the digital network and ultimately to the digital client at step 630*b*.

Accordingly, by using the inventive digital upgrade system 200, the otherwise outdated customer premises equipment can be replaced with a digital upgrade without having to replace the entire equipment. In this way, resources can be conserved by only replacing obsolete analog software modules and radios with the digital upgrade system 200 presented herein.

In a preferred yet exemplary embodiment, the digital upgrade system 200 can replace an analog radio used in the Numerex Corp.'s "1650" model device. Specifically, the analog radio can be removed from the equipment and replaced with the digital upgrade system 200. For example, the "CMM-7700", marketed by or on behalf of Numerex Corp. and used in the Numerex "1650", may be replaced by the digital upgrade system 200. In this way, the digital upgrade system 200 can allow the Numerex "1650" model device to continue to operate by interfacing with the new Cellemetry® SMS digital network.

An example of the application of this invention and its exemplary embodiment would be with wireless data products, such as Numerex Corp.'s "1650". The "1650" device relies on analog control channel data transports. With the advent of Numerex's Cellemetry®t Data Service data service, the "1650" device must transition from analog to digital SMS. In this case, the analog control channel data transport radio transceiver can be removed from the product and replaced with a SMS capable radio transceiver and a software module to translate interface requirements of the analog control channel data transport radio transceiver to and from the interface requirements of the SMS radio transceiver. In this way, the legacy portion of the wireless data product will continue to operate as if it were communicating with an analog control channel data transport radio transceiver when, in fact, it is actually communicating with a SMS radio transceiver using a different protocol. It should be noted that the software translation software could reside within an SMS radio transceiver or it could also be implemented as a separate physical module.

The following describes the representative interface requirements of the digital upgrade system to CPE Host interface in a "1650" device, according to an exemplary embodiment. Communications with the CPE Host are in a binary format with a fixed framework consisting of: 1 byte Start character; 1 byte data length; (n) bytes of data; and 1 byte checksum.

At the start of the communications process, an attention command is echoed between the CPE Host and the digital upgrade system microprocessor. This establishes the communication connection. Upon receipt, the attention command is echoed back to the CPE Host by the digital upgrade system. Upon receipt of the command the subsequent received characters are organized into a message. Any character not preceded with a "Start of Text" framework is ignored. If the message is a data message (no data), the message includes length, data, and a checksum. The data portion of the message is typically between 0 and 253 bytes.

To process an incoming message, the command/message is interrogated to determine the processing required. Command processing includes the following: valid fully supported command, respond as required; supported command to be ignored; and unsupported command, NAK returned. Fully supported commands are checked for security level. If the security level is valid processing continues; otherwise, a NAK is returned to the CPE Host. After passing security, processing continues based on the command type.

The foregoing description of the exemplary embodiments of the digital upgrade system has been presented only for the purposes of illustration and description and is not intended to be exhaustive or the limit the digital upgrade system to the precise embodiments disclosed. Many modifications and variations are possible in light of the above teachings and fall within the spirit and scope of the present invention. The embodiments described herein were chosen in order to explain the principles of the digital upgrade system and their practical application so as to enable others skilled in the art to utilize the digital upgrade system in various embodiments and with various modifications suited to their particular use.

I claim:

1. A digital upgrade system for an analog wireless data device having an analog signal processing function and a pre-existing form factor comprising linear dimensions of the device, comprising:
   a digital radio transceiver for communicating signals via a digital wireless network, each of the signals compatible with a digital wireless data transport; and
   a software module, functionally connected to the digital radio transceiver, for performing the steps of:
   receiving a digital command output by the digital radio transceiver, the digital command carried by one of the signals compatible with the digital wireless data transport and received by the digital radio transceiver;
   translating the digital command into an analog command compatible with an analog data transport associated with the analog wireless data device; and
   outputting the analog command for processing by the analog wireless data device,
   wherein the digital radio transceiver and the software module are designed to replace a corresponding analog radio transceiver of the analog wireless data device and configured to fit within the pre-existing form factor of the analog wireless data device.

2. The digital upgrade system of claim 1, wherein the software module interfaces with the analog wireless data device substantially in the same manner as the analog radio transceiver previously interfaced with the analog wireless data device.

3. The digital upgrade system of claim 1, wherein each of the digital wireless signals comprises a SMS digital-formatted message.

4. The digital upgrade system of claim 3, wherein the software module translates the SMS digital-formatted message to an AMPS analog-formatted message.

5. The digital upgrade system of claim 1, wherein the software module and digital radio transceiver are integrated within a single unit for use in the analog wireless data device.

6. The digital upgrade system of claim 1, wherein the software module further performs the steps of:
   receiving an analog command from the analog wireless data device;
   translating the analog command into a digital command compatible with the digital radio transceiver; and
   outputting the digital command to the digital radio transceiver for transmission as one of the digital wireless signals via the digital wireless data transport.

7. The digital upgrade system of claim 1, wherein the digital radio transceiver uses a MIN to determine the command received over the digital wireless network.

8. The digital upgrade system of claim 1, wherein the software module uses a MIN to determine the command received over the digital wireless network.

9. A digital upgrade system for prolonging the useful life of wireless data products, comprising:
   a printed circuit board of substantially the same size and shape as an analog wireless data radio transceiver, the printed board comprising:
   interconnecting wiring;
   a digital radio transceiver for communicating signals via a digital wireless network, each of the signals compatible with a digital wireless data transport; and
   a microprocessor operable to translate a digital command carried by one of the signals communicated via the digital wireless network into an analog command to be processed by the analog wireless data device, wherein the microprocessor performs the steps of:
   receiving the digital command from the digital radio transceiver, the digital command obtained by the digital radio transceiver in response to processing one of the signals compatible with the digital wireless data transport;
   translating the digital command into an analog command compatible with an analog wireless data transport associated with the analog wireless data device; and
   outputting the analog command to the analog wireless data device.

10. The digital upgrade system of claim 9, the printed board further comprising a pin header that fits substantially within a form-fit pre-existing pin connection on the analog wireless data device.

11. The digital upgrade system of claim 9, wherein the digital command comprises an SMS message and the analog signal comprises an AMPS message.

12. A method for translating a digital command compatible with a digital wireless network for processing by an analog wireless data device, comprising the steps of:
   replacing an analog radio transceiver of the analog wireless data device with the combination of a digital radio transceiver and a software module, each configured to fit within a pre-existing form factor of the analog wireless data device.
   obtaining the digital command in response to processing a signal received by the digital radio transceiver via the digital wireless network, the signal compatible with a digital wireless data transport;
   translating at the software module the digital command into an analog command compatible with an analog data transport associated with the analog wireless data device; and
   outputting the analog command from the software module for processing by the analog wireless data device.

13. The digital upgrade system of claim 12, wherein the digital command comprises an SMS message.

14. The digital upgrade system of claim 12, wherein the digital command is translated to an AMPS message.

15. A method for prolonging the useful life of an analog wireless data device, comprising the steps of:
   removing an analog radio transceiver from the analog wireless data device;
   replacing the analog radio transceiver with a component of substantially the same size as the analog radio transceiver, the component comprising a digital radio transceiver and a software module, the component designed to connect to the analog wireless data device through a pre-existing form-fitting connection, the component operative to perform the steps of:
   obtaining the digital command in response to processing a signal received by the digital radio transceiver via a digital wireless network, the signal compatible with a digital wireless data transport;

using the software module to translate the digital command into an analog command compatible with the analog wireless data device; and outputting the analog command from the software module for processing by the analog wireless data device.

16. The digital upgrade system of claim 15, wherein the digital command comprises an SMS message.

17. The digital upgrade system of claim 16, wherein the software module translates the SMS message to an AMPS message.

18. The method of claim 15, wherein the digital radio transceiver uses a mask and MIN number to determine the command received over the wireless data transport.

19. The method of claim 15, further comprising the steps of:

receiving at the software module an analog command from the analog wireless data device;

using the software module to translate the analog command into a digital command compatible with the digital radio transceiver; and outputting the digital command to the digital radio transceiver for communication via the digital wireless data transport.

20. A digital upgrade system for an analog wireless data device having an analog signal processing function and a pre-existing form factor comprising linear dimensions of the device, comprising:

a digital radio transceiver for communicating signals via a digital wireless network, each of the signals compatible with a digital wireless data transport; and a software module, functionally connected to the digital radio transceiver, operable to translate a message from the digital radio transceiver by performing the steps of:

receiving a digital command output by the digital radio transceiver, the digital command carried by one of the signals compatible with the digital wireless data transport and received by the digital radio transceiver;

translating the digital command into an analog command compatible with an analog data transport associated with the analog wireless data device; and outputting the analog command for processing by the analog wireless data device, and operable to translate a message from the analog wireless data device by performing the steps of:

receiving an analog command from the analog wireless data device;

translating the analog command into a digital command compatible with the digital radio transceiver; and outputting the digital command to the digital radio transceiver for transmission as one of the digital wireless signals via the digital wireless data transport, wherein the digital radio transceiver and the software module are designed to replace a corresponding analog radio transceiver of the analog wireless data device and configured to fit within the pre-existing form factor of the analog wireless data device.

\* \* \* \* \*